Jan. 8, 1929.

H. MAXWELL 1,698,315

CONTROL OF INDUCTION MOTORS

Filed Oct. 16, 1926   2 Sheets-Sheet 1

Inventor:
Howard Maxwell,
by
His Attorney.

Jan. 8, 1929.

H. MAXWELL 1,698,315

CONTROL OF INDUCTION MOTORS

Filed Oct. 16, 1926    2 Sheets-Sheet 2

Inventor:
Howard Maxwell,
by
His Attorney.

Patented Jan. 8, 1929.

1,698,315

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

CONTROL OF INDUCTION MOTORS.

Application filed October 16, 1926. Serial No. 142,095.

My invention relates to the control of induction motors and particularly to such motors having windings adapted to operate with different pole members.

Such motors will not only operate at two different speeds but are usually capable of developing different outputs at the different speeds. One particular use to which such motors are applied is in connection with oil well pumps. Such motors are operated with the higher number of poles (low speed) for driving the pump which raises the oil out of the well, and with the smaller number of poles (high speed) for pulling the well. By the latter expression is meant, the pulling out of the pump rods, tubing, etc., to clear any obstruction which has clogged the pump. A considerable amount of power is required to hoist these parts, and as it is necessary that this work be done in a hurry, the motor is operated with the lower number of poles and is designed so as to be capable of developing a higher output with the motor connected for the lower number of poles than when connected for the higher number of poles. It has been found in practice that operators in pulling the well operate the control to cut the resistance elements out of the secondary more rapidly than the motor is able to respond thereto. This results in the motor taking a large amount of current and developing a low torque.

In order to prevent the conditions described above, when induction motors of the type adapted to operate with different pole numbers are used in connection with oil well pumps or in other applications where similar conditions are likely to prevail, I have devised a simple and novel control system for such motors, in which a portion of the resistance is always left in the secondary circuit when the motor is operating at a speed corresponding to one pole number and in which all the resistance can be cut out of the secondary circuit of the motor when it is operating at a speed corresponding to the other pole number.

Figure 2:
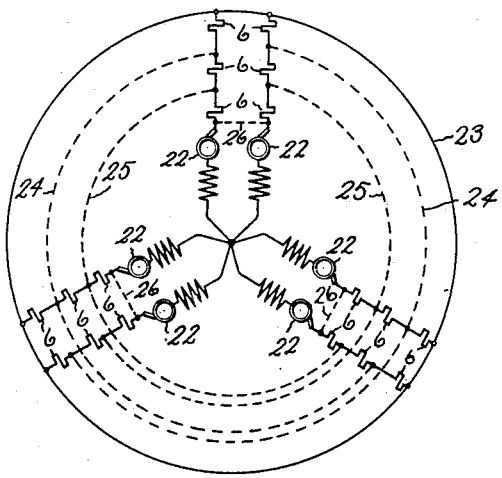
Figure 3:
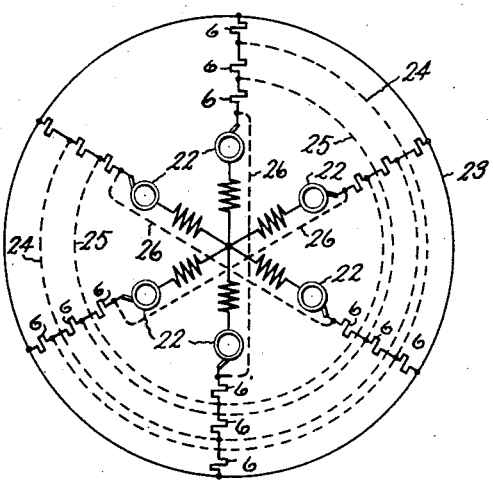

The various features of novelty which characterize my invention are pointed out in the claims annexed to and forming a part of this specification. For a better understanding of my invention, reference may be had to the following description taken in connection with the accompanying drawing, in which Fig. 1 is a simplified diagram of a control system of an induction motor embodying my invention, Fig. 2 is a diagram of the secondary winding when the motor is connected for one pole number, and Fig. 3 is a diagram like Fig. 2, when the motor is connected for the other pole number.

Figure 1:
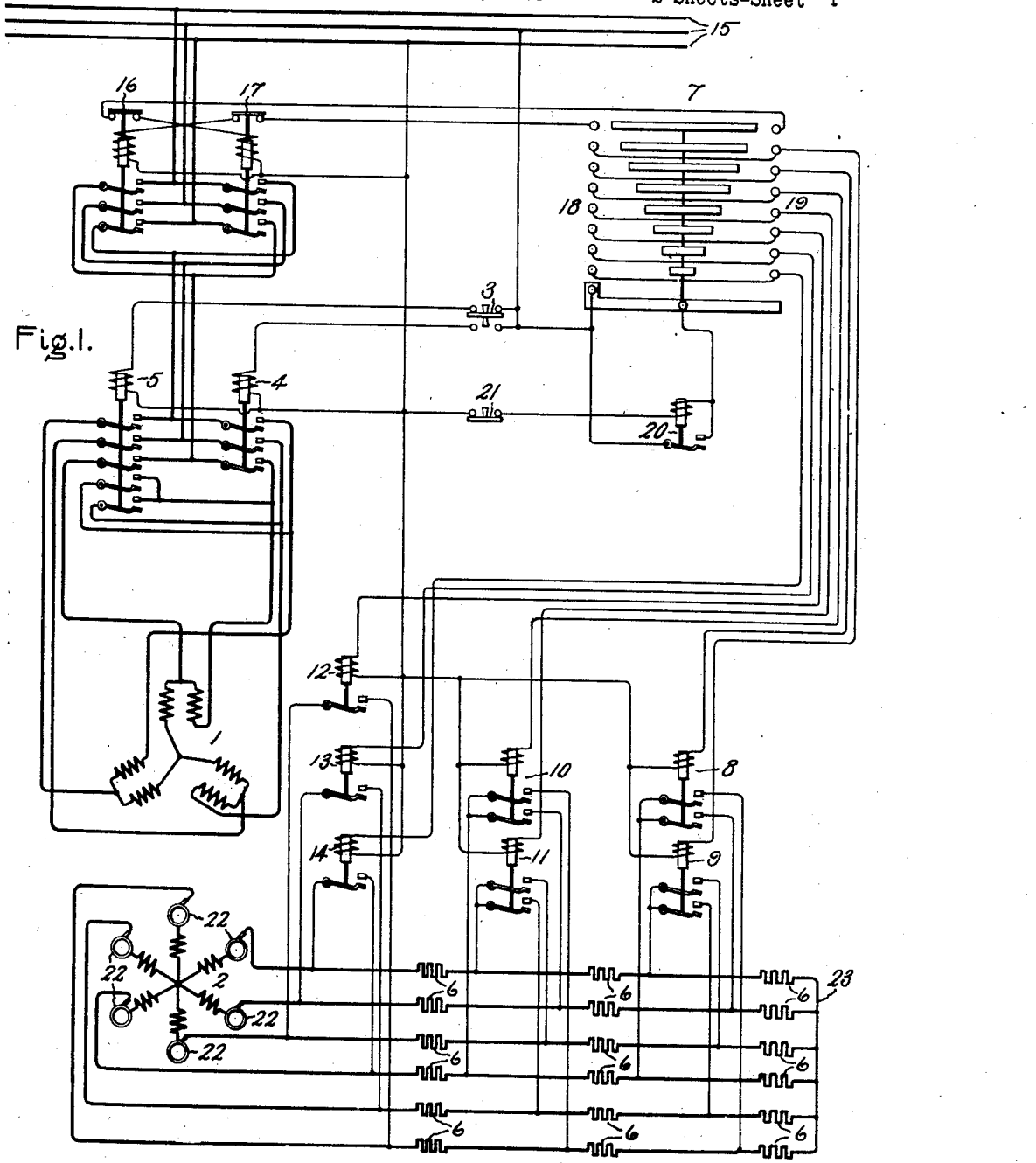

Referring to Fig. 1 of the drawing, there is shown an induction motor having a primary winding 1 and a secondary winding 2, which are adapted to operate with different pole numbers. Switch mechanism comprising a push button switch 3 and contactors 4 and 5 are provided for establishing the circuit of the primary winding for either of the pole numbers. Resistance elements 6 are connected in the secondary circuit of the motor. A controller is provided for establishing a series of connections in step by step relation through a range of positions. This controller is shown as comprising a master switch 7 and contactors 8, 9, 10, 11, 12, 13 and 14. These contactors are provided for cutting all of the resistance elements 6 out of the secondary circuit when the motor is operating at a speed corresponding to one pole number and cutting only a portion of the resistance elements 6 out of the secondary circuit when the motor is operating at a speed corresponding to the other pole number. This controller is operative throughout its full range with the switch mechanism operated to establish the circuit of the primary winding for either of the pole numbers and establishes exactly the same connections under these conditions.

The primary winding is shown as of the type that, when connected for the higher number of poles and consequently low speed, it is connected as a single Y and when connected for the lower number of poles and high speed, it is connected as a multiple Y. The secondary winding is arranged so that its coils are in different phases for one pole number and are in the same phase for the other pole number. That is, when the primary winding is connected for the higher number of poles, the secondary winding is arranged so that its coils are in a star as shown in Fig. 3 and when the primary is connected for the lower number of poles, its coils are arranged in a multiple Y as shown in Fig. 2. The particular arrangement shown is for a speed ratio of two to one, and for the higher number of poles the coils are arranged in a six phase star, the coils which were in phase for the lower number of poles being 180° out of phase for the higher number of poles.

Referring to Fig. 1 more in detail, a three phase source of alternating current 15 is connected to the primary winding 1 of the motor through one or the other of the contractors 16 or 17, depending upon the direction of rotation desired. The operation of these contractors, together with contractors 4, 5 and 8 to 14 are controlled by the master switch 7. This master switch has contacts 18 for one direction of operation and contacts 19 for the other direction of operation. An under voltage release contactor 20 has its circuit closed, when the master switch is in the off position through the two lower stationary contacts 18 and 19. When it is closed, it remains closed throughout the operation of the master switch, unless its circuit is interrupted by the push button switch 21 or by under voltage conditions on the line. When the contactor 20 is closed, current is supplied to the movable contacts of the switch 7, but if the switch 20 is opened either due to the opening of push button switch 21 or under voltage on the line, it is necessary to move the master switch to the off position before switch 20 can be closed again and current again supplied to the movable contacts of switch 7.

Before the master switch is moved from the off position, push button switch 3 is moved into one of its two positions, thus energizing either of the contactors 4 or 5. If contactor 4 is closed, the primary winding is connected for low speed and higher number of poles, and if contactor 5 is closed, the primary winding is connected for high speed and the smaller number of poles. Moving the master switch in one direction or the other into its first position, either contactor 16 or 17 is closed, starting the motor in one direction or the other with all the resistance elements 6 connected in the secondary circuit of the motor. These resistance elements are in series with the coils of the secondary winding and are connected between collector rings 22 and the neutral point 23. The next position of the master switch closes contactor 8, which cuts out of circuit the resistance elements in three coils of the secondary winding located 120 electrical degrees apart. Further movement of the master switch closes contactor 9 cutting out resistance elements in the other three coils of the secondary winding. The next positions of the master switch successively cut out of the secondary circuit more resistance elements by means of contactors 10 and 11 in the same way as contactors 8 and 9. Further movement of the master switch closes successively contactors 12, 13 and 14, each of which closes a circuit across two collector rings 22. The collector rings which are connected together are those at the ends of coils of the secondary winding which are out of phase for one pole number and in the example shown 180 electrical degrees out of phase, and which are in the same phase for the other pole number. It will be noted that no neutral point is established by these last positions of the master switch. Except for the first position of the master switch, the same connections are made by the master switch and the contactors it controls, no matter in which direction it is moved.

It will also be seen that the same connections are made by the master switch and the contactors it controls, no matter for which pole number the push button switch 3 and contactors 4 and 5 have been operated to establish.

The connection established in the secondary circuit of the motor, when the primary is connected for the low number of poles and high speed is shown in Fig. 2. The dotted lines 24 and 25 show how a portion of the resistance elements are cut out by establishing neutral points on sets of the coils of the secondary winding which are 120 electrical degrees out of phase. The dotted lines 26 show the last connections made by the controller. These connections, however, are across the ends of the coils which are in the same phase and no neutral point is established. Since these ends of the coils are of the same potential and phase, no material change is made in the connections of the secondary winding by the connections 26, and therefore in the last position of the controller a portion of the resistance elements remain in the secondary circuit of the motor.

The connections established in the secondary circuit of the motor, when the primary is connected for the high number of poles and low speed is shown in Fig. 3. The connections 24 and 25 show how a portion of the resistance elements is cut out of the secondary circuit in the same way as described in connection with Fig. 2. The connections 26, however, are now across collector rings connected to the ends of coils which are 180 electrical degrees out of phase, whereby the secondary winding is completely short-circuited and all the resistance elements cut out.

It will, therefore, be seen that when the motor is connected for high speed operation as for pulling a well, a portion of the resistance elements is left in the secondary circuit of the motor, thereby causing the motors to develop a high torque with a comparatively low current, even though the operator moves the controller to cut the resistance out of the secondary circuit very rapidly.

I desire it to be understood that my invention is not limited to the particular arrangement shown and described and that a drum controller may be used instead of a master controller and contactor. I aim in the appended claims to cover such a modification as well as any others which do not depart from the spirit and scope of my invention.

What I claim as new and desire to secure by Letters Patent of the United States is:

1. In combination, an induction motor having primary and secondary windings adapted to operate with different pole numbers, switch mechanism for establishing the circuit of said primary winding for either of said pole numbers, resistance elements connected in said secondary circuit, and a controller for establishing a series of connections in step by step relation through a range of positions, said controller being operative throughout its full range with said switch mechanism operated to establish the circuit of said primary winding for either of said pole numbers, said controller interconnecting said secondary winding and said resistance elements so as to cut all of said resistance elements out of said secondary circuit in the last position of the controller when said motor is operating at a speed corresponding to one pole number and so as to cut only a portion of said resistance elements out of said secondary circuit in the last position of the controller when said motor is operating at a speed corresponding to the other pole number.

2. In combination, an induction motor having primary and secondary windings adapted to operate with different pole numbers, switch mechanism for establishing the circuit of said primary winding for either of said pole numbers, resistance elements connected in said secondary circuit, and a controller for establishing a series of connections in step by step relation through a range of positions, said controller being operative throughout its full range with said switch mechanism operated to establish the circuit of said primary winding for either of said pole numbers, said controller interconnecting said secondary winding and said resistance elements so as to cut all of said resistance elements out of said secondary circuit in the last position of the controller when said motor is operating at a speed corresponding to the higher number of poles and so as to cut only a portion of said resistance elements out of said secondary circuit in the last position of the controller when said motor is operating at a speed corresponding to the smaller number of poles.

3. In combination, an induction motor having primary and secondary windings adapted to operate with different pole numbers, switch mechanism for establishing the circuit of said primary winding for either of said pole numbers, resistance elements connected in said secondary circuit, and a controller for cutting said resistance elements out of said secondary circuit, said controller establishing the same connections with said switch mechanism operated to establish the circuit of said primary member for either of said pole numbers, said controller interconnecting said secondary winding and said resistance elements so as to cut all of said resistance elements out of said secondary circuit in the last position of the controller when said motor is operating at a speed corresponding to one pole number and so as to cut only a portion of said resistance elements out of said secondary circuit in the last position of the controller when said motor is operating at a speed corresponding to the other pole number.

4. In combination, an induction motor having primary and secondary windings adapted to operate with different pole numbers, switch mechanism for establishing the circuit of said primary winding for either of said pole numbers, resistance elements connected in said secondary circuit, and a controller for cutting said resistance elements out of said secondary circuit, said controller establishing the same connections with said switch mechanism operated to establish the circuit of said primary member for either of said pole numbers, said controller interconnecting said secondary winding and said resistance elements so as to cut all of said resistance elements out of said secondary circuit in the last position of the controller when said motor is operating at a speed corresponding to the higher number of poles and so as to cut only a portion of said resistance elements out of said secondary circuit in the last position of the controller when said motor is operating at a speed corresponding to the smaller number of poles.

5. In combination, an induction motor having primary and secondary windings adapted to operate with different pole numbers, said secondary winding comprising coils which when operating at one pole number are arranged in the same phase and when operating at the other pole number are arranged so that they are in different phases, resistance elements in series with each of said coils, and means for successively connecting points on said resistance elements together in order to cut a portion of said resistance elements out of the circuit of the secondary winding and connect the ends of the coils which are in the same phase for one pole number and out of phase for the other pole number together without establishing a neutral point.

6. In combination, an induction motor having primary and secondary windings adapted to operate with different pole numbers, switch mechanism for establishing the circuit of said primary winding for either of said pole numbers, said secondary winding comprising coils which when operating at one pole number are arranged in the same phase and when operating at the other pole number are arranged so that they are in different phases, resistance elements in series with each of said coils, and a controller for establishing a series of connections in step by step relation through a range of positions, said controller being operative throughout its full range when said switch mechanism has established the circuit of said primary winding for either of said pole numbers, said controller being adapted to successively connect points on said resistance elements together in order to cut a portion of said resistance elements out of the circuit of the secondary winding and connect the ends of the coils which are in the same phase for one pole number and out of phase for the other pole number together without establishing a neutral point.

7. In combination, an induction motor having primary and secondary windings adapted to operate with different pole numbers, switch mechanism for establishing the circuit of said primary winding for either of said pole numbers, said secondary winding comprising coils which when operating at one pole number are arranged in the same phase and when operating at the other pole number are arranged so that they are in different phases, resistance elements in series with each of said coils, and a controller for cutting said resistance elements out of said secondary circuit, said controller establishing the same connections with said switch mechanism operated to establish the circuit of said primary member for either of said pole numbers, said controller successively connecting points on said resistance elements together in order to cut a portion of said resistance elements out of the circuit of the secondary winding and connect the ends of the coils which are in the same phase for one pole number and out of phase for the other pole number together without establishing a neutral point.

8. In combination, an induction motor having primary and secondary windings adapted to operate with different pole numbers, said secondary winding comprising coils which when operating at one pole number are arranged in the same phase and when operating at the other pole number are arranged so that they are 180 electrical degrees out of phase, resistance elements in series with each of said coils, and means for successively connecting points on said resistance elements together in order to cut a portion of said resistance elements out of the circuit of the secondary winding and connect the ends of the coils which are in the same phase for one pole number and 180 electrical degrees out of phase for the other pole number together without establishing a neutral point.

9. In combination, an induction motor having primary and secondary windings adapted to operate with different pole numbers, switch mechanism for establishing the circuit of said primary winding for either of said pole numbers, said secondary winding comprising coils which when operating at one pole number are arranged in the same phase and when operating at the other pole number are arranged so that they are 180 electrical degrees out of phase, resistance elements in series with each of said coils, and a controller for establishing a series of connections in step by step relation through a range of positions, said controller being operative throughout its full range when said switch mechanism has established the circuit of said primary winding for either of said pole numbers, said controller being adapted to successively connect points on said resistance elements together in order to cut a portion of said resistance elements out of the circuit of the secondary winding and connect the ends of the coils which are in the same phase for one pole number and 180 electrical degrees out of phase for the other pole number together without establishing a neutral point.

10. In combination, an induction motor having primary and secondary windings adapted to operate with different pole numbers, switch mechanism for establishing the circuit of said primary winding for either of said pole numbers, said secondary winding comprising coils which when operating at one pole number are arranged in the same phase and when operating at the other pole number are arranged so that they are 180 electrical degrees out of phase, resistance elements in series with each of said coils, and a controller for cutting said resistance elements out of said secondary circuit, said controller establishing the same connections with said switch mechanism operated to establish the circuit of said primary member for either of said pole numbers, said controller successively connecting points on said resistance elements together in order to cut a portion of said resistance elements out of the circuit of the secondary winding and connect the ends of the coils which are in the same phase for one pole number and 180 electrical degrees out of phase for the other pole number together without establishing a neutral point.

In witness whereof, I have hereunto set my hand this 15th day of October, 1926.

HOWARD MAXWELL.